Sept. 5, 1950   E. R. PATTERSON   2,521,249
RIM FOR TIRES

Filed May 2, 1946   2 Sheets-Sheet 1

*INVENTOR.*
EDWARD R. PATTERSON
BY *Victor J. Evans & Co.*
ATTORNEYS

Sept. 5, 1950  E. R. PATTERSON  2,521,249
RIM FOR TIRES

Filed May 2, 1946  2 Sheets-Sheet 2

*INVENTOR.*
EDWARD R. PATTERSON
BY *Victor J. Evans & Co.*
ATTORNEYS

Patented Sept. 5, 1950

2,521,249

UNITED STATES PATENT OFFICE 2,521,249

RIM FOR TIRES

Edward R. Patterson, Wingdale, N. Y.

Application May 2, 1946, Serial No. 666,589

1 Claim. (Cl. 152—413)

This invention relates to rims for pneumatic tires and more particularly to a circumferentially split rim that will enable a tire to be changed if damaged, without removing the wheel from the axle on which it is mounted.

An object of the invention is to provide a rim of this character that will facilitate the mounting and dismounting of a tire and prevent damage thereto during such operations.

Another object of the invention is to provide a rim of this character that is durable in construction, efficient in use and for the purpose designed, can be inexpensively manufactured.

With the above and other objects in view, the invention consists of the novel details of construction, arrangement and combination of parts more fully hereinafter described, claimed and illustrated in the accompanying drawings, in which:

Figure 1:
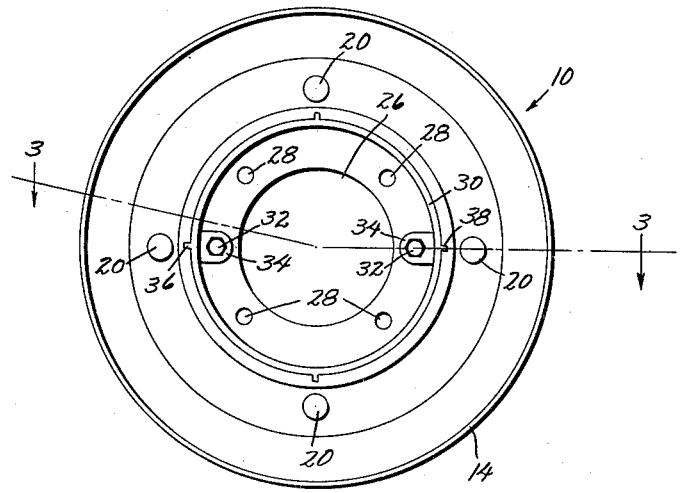
Figure 1 is an elevational view of an embodiment of the invention.
Figure 2:
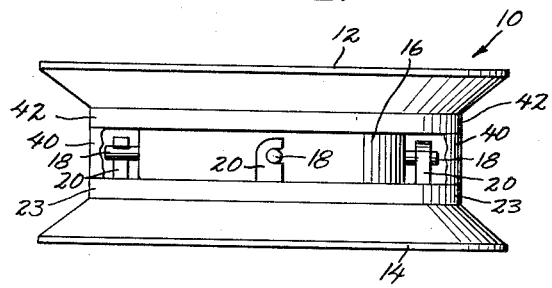
Figure 2 is a peripheral view thereof partially broken away to show the connecting means for the sections.
Figure 3:
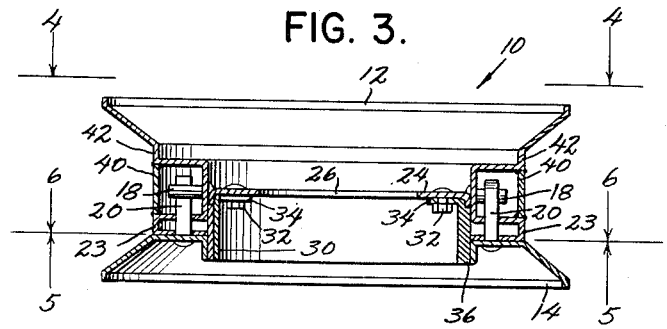
Figure 3 is a sectional view on the line 3—3 of Figure 1.
Figure 4:
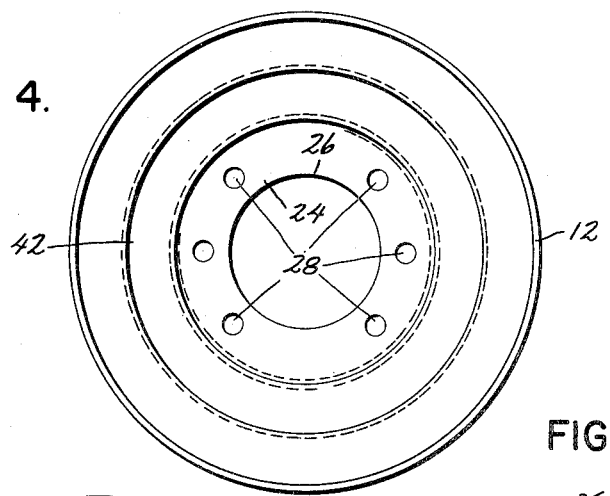
Figure 4 is a view looking in the direction of the arrows on the line 4—4 of Figure 3.
Figure 5:
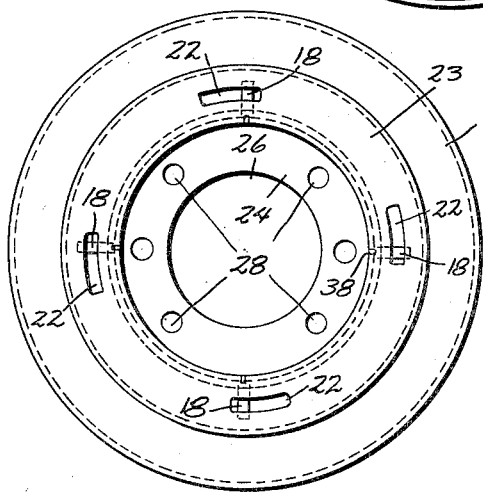
Figure 5 is a plan view of one of the sections taken on the line 5—5 of Figure 3.
Figure 7:
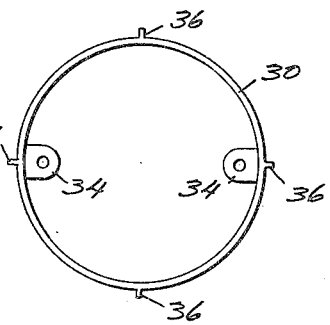
Figure 7 is an elevational view of an insert.
Figure 8:
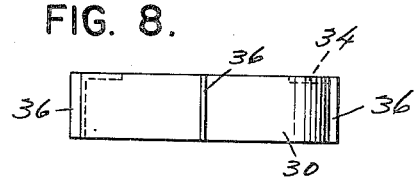
Figure 8 is a peripheral view thereof.
Figure 6:
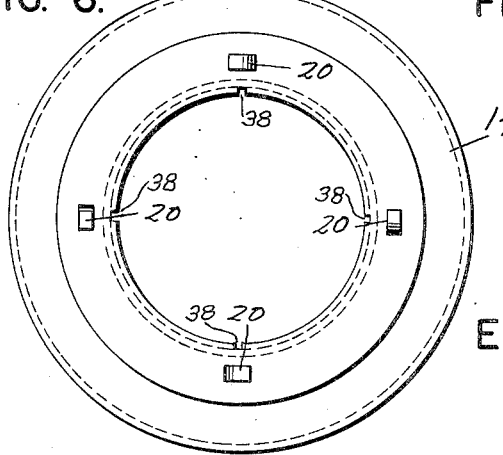
Figure 6 is a plan view of the other of the sections taken on the line 6—6 of Figure 3.
Figure 9:
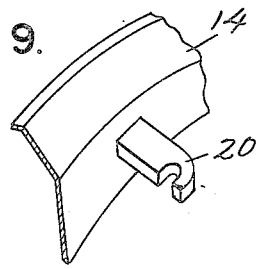
Figure 9 is a detailed fragmentary view of one of the latch members.

Referring more in detail to the drawings, the reference numeral 10 designates the tire rim which is circumferentially split to form the sections 12 and 14 respectively. Section 12 is a fixed section and section 14 is a removable section.

The annular ring portion 16 of the fixed section 12 is provided with diametrical pairs of opposed lugs 18 which extend outwardly thereof at right angles thereto, and the removable section 14 has a horizontally disposed shoulder portion that is provided with hooks 20 that extend through the curved elongated slots 22 in the outwardly extending internal shoulder portion 23 of the fixed section 12 to engage the lugs 18. The shoulder portion of the removable section 14 and the shoulder portion of the fixed section 12 thus are in face to face engagement with each other.

The fixed section 12 has welded thereto in the conventional manner, the wheel mounting portion 24 having the central aperture 26 for the axle and the apertures 28 concentric therewith for receiving the wheel attaching bolts whereby the portion 24 is attached to a brake drum (not shown).

To prevent the sections from being separated, the rim insert 30 is seated in the removable section 14 and engages the portion 24 to be secured thereto by bolts 32 entering the apertured ears 34 on the insert 30. These ears are provided on the inner periphery of the insert in opposed parallel relation to each other, and diametrically opposed transverse ribs 36 formed on the outer periphery of the insert are received in slots 38 formed in each section, which are in alinement after the hooks 20 have engaged the lugs 18.

To protect the tube from coming in contact with the lugs and latches, an annular ring 40 is spot welded to the shoulder 23 and to the opposed parallel shoulder 42 on the fixed section 12, and the beads of the tire engage these shoulders while the tube engages the ring 40.

With the tire mounted on the rim, removal thereof is accomplished by removing the bolts 32 and subsequent removal of the insert 30, then by turning the removable section 14 in an anti-clockwise manner, the hooks 20 are disengaged from the lugs 18 and this section is removed, permitting removal of the tire without removing the fixed section 12 from the axle. Mounting of the tire on the rim is accomplished in the reverse manner. By inserting the hooks 20 through the slots 22 and turning the removable section 14 in a clockwise manner, then replacing the insert 30 and bolts 32 to retain the insert in place and the sections fixedly connected together.

Thus there has been provided a rim which will accomplish the objects of the invention, and it is believed that the operation and construction thereof will be apparent to those skilled in the art.

It is also to be understood that changes in the details of construction, arrangement and combination of parts may be resorted to, provided they fall within the spirit of the invention and the scope of the appended claim.

Having thus described the invention, what is claimed as new and desired to be secured by Letters Patent is:

A rim of the character described, comprising a pair of rim sections, one of said sections being a fixed section and the other of said sections being a removable section, the fixed section being fixed to the brake drum of a motor vehicle and the removable section being removably connected to said fixed section, outwardly extending lugs on the fixed section, hooks on the removable section for engagement with said lugs whereby said sections are latched in fixed relation to each other, an annular ring carried by said fixed section and adapted to cover said lugs and said hooks to prevent the tube mounted thereon from being damaged thereby, and removable means for preventing the sections from becoming unlatched, said means comprising a circular insert, having transverse ribs thereon, vertical slots in said sections to receive said ribs and apertured ears on said insert for the connection thereof to said fixed section.

EDWARD R. PATTERSON.

REFERENCES CITED

The following references are of record in the file of this patent:

UNITED STATES PATENTS

| Number | Name | Date |
|---|---|---|
| 1,382,672 | Racer | June 28, 1921 |

FOREIGN PATENTS

| Number | Country | Date |
|---|---|---|
| 548,040 | France | of 1922 |